Figure 2:
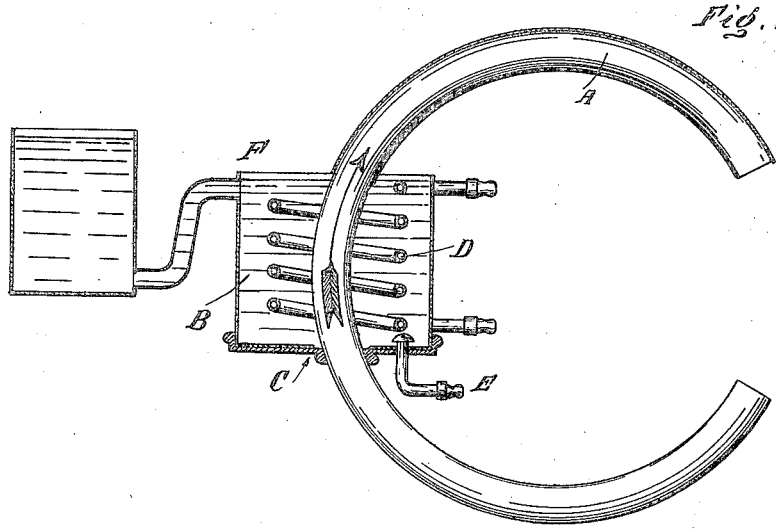

Feb. 17, 1931.  U. PESTALOZZA  1,792,702
MANUFACTURE OF RUBBER GOODS
Filed Nov. 24, 1928

Inventor:
Ugo Pestalozza
By
Attorney.

Patented Feb. 17, 1931

1,792,702

UNITED STATES PATENT OFFICE

UGO PESTALOZZA, OF MILAN, ITALY, ASSIGNOR TO SOCIETÁ ITALIANA PIRELLI, OF MILAN, ITALY

MANUFACTURE OF RUBBER GOODS

Application filed November 24, 1928, Serial No. 321,680, and in Italy November 30, 1927.

In my Patent No. 1,717,248, there is described a process for the manufacture of rubber goods of various kinds from liquid mixtures of latex, by means of a local heating. The simplest way of working this process consists in the immersion of a mould or core, heated by any means before and during the said immersion, in a suitable bath of latex.

Here, and in what follows, the word "latex", means the latex of any caoutchouc-bearing plant, particularly *Hevea brasiliensis*, preserved or not with ammonia and/or with any other anticoagulant, and to which may be added sulphur and/or accelerators, and/or metallic oxides, and/or reclaimed rubber, rubber substitutes and/or any mineral ingredients or fillers used in the rubber trade.

The said process, though so simple, is, however, often inconvenient on account of the size of the bath and of other drawbacks. A new way of carrying out the process has now been found, which not only eliminates these objections, but enables the use of a much smaller bath.

In the case of inner tubes for motor cars and cycles, or any other article of hard or soft rubber of substantial length of cylindrical type with a regular surface obtained by deposition on cylindrical cores or mandrels, it has been found desirable to use a vessel closed at the bottom by diaphragm of soft rubber or any other material capable of adhering to the core or mandrel, the shape of which is to be followed; for instance, a soft rubber diaphragm, having a hole which, in normal condition, is narrower than the core or mandrel.

By lifting with a uniform motion the mandrel heated internally by hot water circulation or by electric current or any other means, through the vessel containing the latex mixture, a uniform layer of rubber will be left on the mandrel, the thickness of which can be regulated by accurately adjusting the temperature of the mandrel, the height of the latex level and the speed at which the mandrel is moved. The vessel containing the latex mixture can be fed continually and the vessel may also contain a coil for cold water circulation to avoid any further thickening of the mixture and to avoid coagulation anywhere save on the surface of the mandrel, though this is not always necessary.

The rubber tube thus formed on the mandrel is then dried either naturally or by any of the usual methods, and afterward vulcanized either on the mandrel itself or, after having been removed, by any of the usual methods. The cores or mandrels can be made of aluminium or aluminium alloys, tin-plated iron, chrome-plated iron, or other metals or alloys as well as of other materials either rigid or flexible. In the latter case, i. e., when flexible cores are used, they can, after drying, be wound round a drum, thus ensuring the vulcanization with the desired curve without changing the mandrel.

Figure 1:
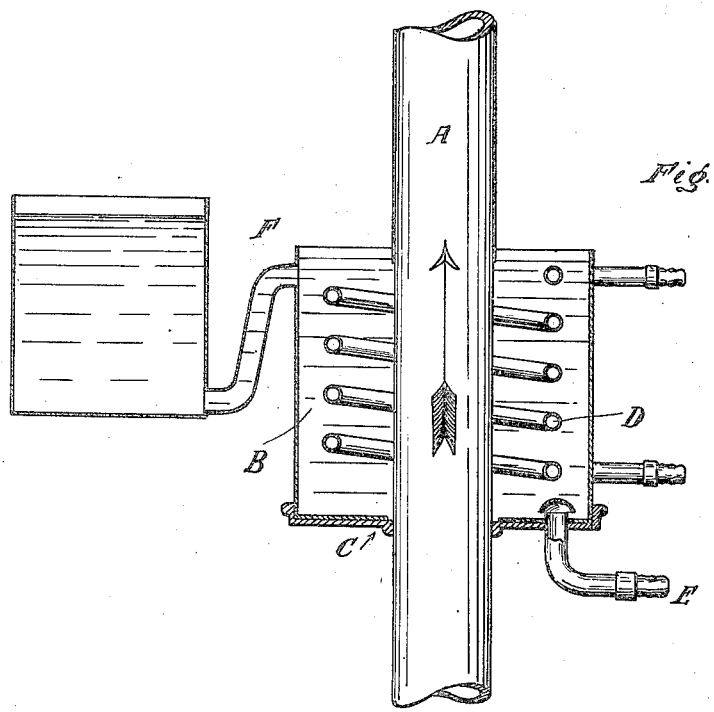

Figure 1 is a diagrammatic sectional view of an apparatus for the manufacture of inner tubes on a straight mandrel, and Fig. 2 is a similar view showing how the tubes can be manufactured on an arcuate mandrel.

The apparatus represented in Fig. 1 consists of a cylindrical vessel V closed at its bottom by a flexible diaphragm C having a central hole, which perfectly adheres to the mandrel A. The latex is fed continually through pipe E. A coil D for circulating cold water ensures the cooling of the mass or body of latex. Mandrel A is heated internally or externally for its whole length or even for a part thereof, and has imparted to it a uniform motion along its axis; and during its movement, it becomes coated with latex and emerges carrying on its surface a regular and uniform layer of latex. With this system, provided care is taken to keep the latex level constant by means of the overflow pipe F, and to maintain the regularity of the heating, all sections of the tube will be formed under precisely the same conditions and thus all disparities which are likely to arise in the case of horizontal immersions will be avoided.

The apparatus shown in Fig. 2 enables inner tubes to be manufactured directly on an arcuate mandrel in substantially the same way as in Fig. 1, using a vessel closed by a diaphragm; but in this case there is the advantage of preparing directly a circular inner tube, thus eliminating the trouble of removing the tube from the straight mandrel and putting it on a circular mandrel for vulcanizing it. The vessel, in this case, should preferably consist of a tank having a rectangular base.

Instead of a single circular ring, it is also possible to use a mandrel having the shape of a coil with several spires placed helicoidally one after the other: in which case the mandrel will be subjected to a helicoidal motion or merely to a rotary motion by displacing simultaneously with rectilinear and uniform motion the vessel containing the latex mixture. This produces a continuous circular tube from which several inner tubes can be cut off before or after the vulcanization.

If desired, it is possible to manufacture inner tubes or hard or soft rubber tubing, either straight or circular, having walls of variable thickness: to attain this, it will be necessary to use a vessel having a vertical trapezoidal section, so that, by the effect of the different heights of the latex level, a part of the metallic core or mandrel will have a more lengthy contact with the said latex mixture. This feature may be useful for inner tubes (motor car, motor cycles), as they can be manufactured with the outer zone (which is subject to a greater strain) having a thickness greater than that of the inner zone.

The structural features above described are, naturally, given by way of example, and are not limitative.

What I claim is:

A process of manufacturing hollow rubber articles, comprising the steps of passing a heated mandrel, in the direction of its axis, a single time through a bath of latex to which have previously been added substances for producing coagulation of the latex locally around the mandrel so as to form a layer of latex on said mandrel by the heat emitted thereby; and so regulating the duration of the said passage of the mandrel through the bath that, under the action of the heat, the layer thickens and then coagulates and attains, during its single passage, the full thickness of rubber required for the finished article to be made.

In testimony whereof I affix my signature.

UGO PESTALOZZA.